(12) United States Patent
Mendoza et al.

(10) Patent No.: US 9,218,837 B2
(45) Date of Patent: Dec. 22, 2015

(54) CONTROL OF STORAGE DEVICE

(75) Inventors: Manuel Mendoza, Houston, TX (US); Monji G Jabori, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/391,418

(22) PCT Filed: May 23, 2012

(86) PCT No.: PCT/US2012/039137
§ 371 (c)(1),
(2), (4) Date: Oct. 9, 2014

(87) PCT Pub. No.: WO2013/176665
PCT Pub. Date: Nov. 28, 2013

(65) Prior Publication Data
US 2015/0162036 A1    Jun. 11, 2015

(51) Int. Cl.
*G11B 15/18*    (2006.01)
*G11B 5/55*    (2006.01)
*G11B 19/04*    (2006.01)

(52) U.S. Cl.
CPC ............ *G11B 5/5582* (2013.01); *G11B 19/043* (2013.01)

(58) Field of Classification Search
None
See application file for complete search history.

(56) References Cited

U.S. PATENT DOCUMENTS

| 7,023,640 | B1 * | 4/2006 | Codilian et al. ................ 360/60 |
| 7,450,332 | B2 | 11/2008 | Pasolini et al. |
| 7,587,057 | B2 | 9/2009 | Baugh et al. |
| 7,752,351 | B1 * | 7/2010 | Overby .......................... 710/32 |
| 7,827,420 | B2 * | 11/2010 | Wong et al. ................... 713/300 |
| 7,965,460 | B2 | 6/2011 | Elliott |
| 8,079,260 | B2 * | 12/2011 | Kawahara ...................... 73/510 |
| 8,937,497 | B1 * | 1/2015 | Tobin ............................ 327/56 |
| 2009/0031808 | A1 | 2/2009 | Kawahara |
| 2009/0200378 | A1 | 8/2009 | Doherty et al. |
| 2010/0061051 | A1 | 3/2010 | Cochrane |

FOREIGN PATENT DOCUMENTS

| CN | 201540507 | 8/2010 |
| EP | 1850343 | 10/2007 |
| WO | WO-2009100009 | 8/2009 |

OTHER PUBLICATIONS

Hu, Y.Y. et al.; "Analysis of Built-in Speaker Induced Structural Acoustic Vibration of Hard Disk Drives in Notebook PC"; Jan. 14-16, 2009; 2 pages.
PCT; Notification of Transmittal of the International Search Report and the Written Opinion of the Interntional Searching Authority, or the Declaration; cited in PCT/US2012/039137; mailed Jan. 2, 2013; 11 pages.

\* cited by examiner

*Primary Examiner* — K. Wong
(74) *Attorney, Agent, or Firm* — HP Legal Department (57) ABSTRACT

Sensor data and audio data are received by a controller. The controller determines if the audio data is above a threshold level. The controller also determines if the sensor data is above a threshold level. The controller can suspend operation of a hard drive based on the data being above or below the threshold level.

20 Claims, 6 Drawing Sheets

CONTROL OF STORAGE DEVICE

BACKGROUND

Portable computing devices can include hard disk drives that may be damaged if the portable computing device is dropped. The hard disk drive may include a park state that the hard disk drive can enter to protect the drive and the data on the drive from damage if the hard drive experiences a shock. A portable computing device may include an accelerometer that can be used to cause the hard disk drive to park the disk heads in anticipation of an impact such as the portable computing device falling and impacting a surface such as a floor or table.

BRIEF DESCRIPTION OF THE DRAWINGS

Some embodiments of the invention are described with respect to the following figures.

DETAILED DESCRIPTION

A portable computing device that includes a hard disk drive that parks the heads in anticipation of an impact also causes the data to stop being accessed. When the heads on the hard disk drive are parked the hard disk drive cannot access data on the disks as the heads cannot read the data when parked. The heads of a disk drive read and write the data to the disks, to do so the heads move back and forth along the surface of the spinning disk.

A portable computing device may include an audio output device. The audio output device may include multiple speakers. Speakers can be engineered to produce sound in a frequency range. Speakers produce sound by moving air, to move the air a speaker vibrates. Lower frequencies require more air to be moved than higher frequencies. The more air that is moved the more vibration the speaker transfers to the computing device. The vibrations from a speaker may cause a sensor such as an accelerometer to produce sensor data over a sensor threshold, causing the storage device, such as a hard disk drive to park the heads in anticipation of an impact. Data access on the hard disk drive is stopped if the hard disk drive heads are parked causing the audio to stop playing or other data to stop being retrieved or written to the hard disk drive.

To prevent the parking of the heads in a storage device the portable computing system can consider multiple factors such as the volume of the audio, the thresholds of the accelerometer, and the direction of the vibrations detected by the accelerometer. In one implementation, a portable computing device can include an accelerometer capable of determining movement in at least two directions and a speaker to play audio which may be capable of vibrating the system. The portable computing device can include a controller to suspend operation of a storage device when the portable computing system accelerometer data is above a threshold level. If the system receives accelerometer data above a threshold along a first axis and not above the threshold in a second axis and the speaker is playing audio, the system does not suspend operation of the storage device.

In another implementation, a method of controlling the stoppage of a storage drive can include receiving, by a controller, accelerometer data from an accelerometer. Audio data can be received by the controller. The operation of the storage device should be stopped based on whether the audio is playing and whether the data from the accelerometer is above an accelerometer threshold.

Figure 1:
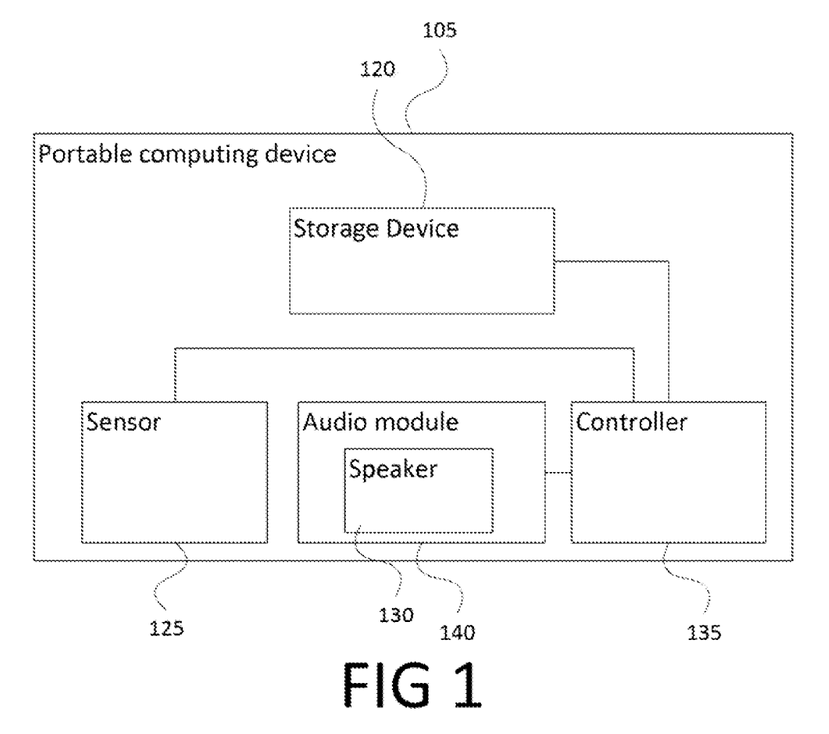
FIG. 1 is a block diagram of a portable computing device including a storage device protection system according to an example implementation.

FIG. 1 is a block diagram of a portable computing device including a storage device protection system according to an example implementation.

A portable computing device 105 can include a sensor 125, such as an accelerometer, capable of determining movement in at least two directions. The directions can be for example the represented by 2 of the 3 axis in an x, y, z coordinate system. In one example the sensor 125 may determine movement along at least the z axis and one of the x and y axis.

The portable computing device can include a speaker 130 to play audio. The speaker may be part of an audio module 140 which can include the sound card. The sound card may drive the speaker and process audio data. The audio data may be for example music, system audio, or another audio source. The audio may be stored as MP3 AAC, WAV, or another format.

The portable computing device can include a storage device 120. Connected to the storage device 120 can be a controller 135. The controller may be internal to or external to the chassis of the storage device 120. The controller is to suspend operation of the storage device 120. The controller 135 may send a signal to the storage device 120 to park the heads of the storage device 120. Parking the heads can prevent damage to the storage device 120 and the data stored on the storage device 120 due to a force above a failure threshold such as generated in an impact from a drop or fall.

The controller 135 determines whether to send the signal to park the heads of the storage device 120 based on whether accelerometer data is above a threshold level. The controller 135 may also determine not to park the heads of the storage device 120 if the portable computing device 105 is only moving in one direction according to the accelerometer. The controller may also take into consideration whether the audio module 140 is playing audio through the speaker 130. For example if the controller determines that the audio is not being played and the accelerometer data is above a threshold amount along the z axis it may park the heads but if the audio is playing the accelerometer threshold may be different along the z axis causing the controller not to park the heads of the storage device 105. In other words the threshold may vary dependent upon whether audio is playing.

Figure 2:
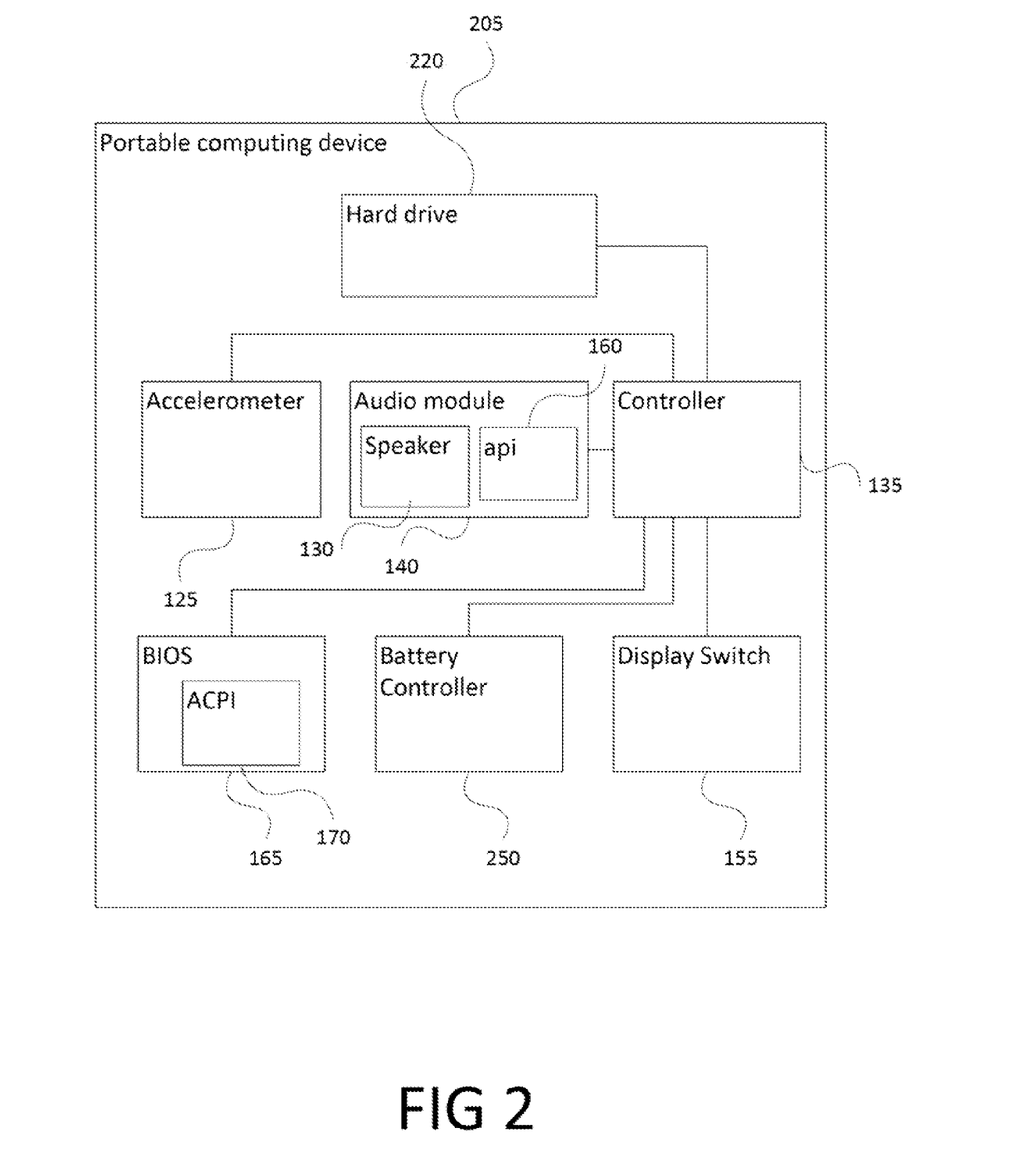
FIG. 2 is a block diagram of a portable computing device including a hard drive protection system according to an example implementation.

FIG. 2 is a block diagram of a portable computing device 205 including a hard drive protection system according to an example implementation. The storage device may be a hard disk drive 220. A hard disk drive may include spinning disks, the disks are magnetized and demagnetized to store binary data such as a 1 or a 0. The magnetization and demagnetization is done by a head that moves in an out between the spinning disks.

The portable computing device may be a notebook form factor where the display is in a housing that is connected to a base housing with a hinge. The portable computing device may include a display switch 155. The display switch 155 may be a reed switch, mechanical switch or another type of switch that can determine if the display housing is closed against the base or open away from the base. The accelerometer threshold can be adjusted higher or lower if the display is closed or open. For example a notebook computer is more likely to be dropped if the display is closed, the computer is also less likely to be impacted by a stoppage of the data when the heads are parked if the display is closed. The display switch may also be a button that a user activates to turn off the display on a tablet form factor computer.

The portable computing device 205 may include an internal power source to power the system when the portable computing device 205 is not connected to an external power source such as an alternating current wall outlet. The internal power source may be a battery or another portable supply of power. The threshold may be adjusted higher or lower if the portable computing device 205 is on internal power such as a battery. For example if the portable computing device 205 is on internal power the threshold for the accelerometer may be adjusted lower thereby making it more likely to reach the threshold and if on external power the threshold may be adjusted higher making it less likely to reach the threshold, since it is more likely the that portable computing device may be dropped if on internal power and less likely to be dropped if it is stationary when connected to an external power source.

The portable computing device 205 may adjust the threshold higher or lower based on the volume level of the audio playing. The volume level of the audio may cause the system to vibrate and cause the controller to mistake the vibrations as a fall and park the heads. For example audio at a low volume may not vibrate the system over the accelerometer threshold but a high volume may vibrate the system over the accelerometer threshold causing the controller to park the head of the hard drive. Since the volume of the audio playing may cause the system to vibrate and confuse the controller into parking the heads of the hard drive the volume level may cause a change in the accelerometer threshold so that at high volume vibrations from the audio do not cause the heads of the hard drive to be parked.

To get the audio level information to the controller an application programming interface (API) can be used. An API is a specification used as an interface by software components to communicate with each other. The API may communicate between the audio module 140 and the controller 135. Audio may also be determined by a microphone or by analyzing the audio data file. For example the system may determine characteristics of the audio from the audio data file such as an MP3 file, WAV file or another audio file.

A basic input/output system (BIOS) 165 can modify the registers of the accelerometer. For example the BIOS may include instructions that cause a change to the registers of the accelerometer 125. The registers may include for example a threshold level for detected movement along an axis. The registers may include the sensitivity level for example, may reduce the number of levels of force that can be distinguished, such that on a scale of 0 to 7 the threshold may be 5 but on a scale of 0 to 3 the threshold may be 2 thereby changing the amount of force required to cause the controller to park the heads of the hard drive 290.

An advanced configuration and power interface (ACPI) 170 may be part of the BIOS 165 to cause changes to the threshold level. ACPI defines platform-independent interfaces for hardware discovery, configuration, power management and monitoring. The specification relates to Operating System-directed configuration and Power Management (OSPM). ACPI can instruct the controller how to interact with the hard drive and the accelerometer causing a change to the thresholds to park the heads of a hard drive 220. For example the ACPI may determine that the portable computer device 205 is operating on battery power or a battery controller 250 may signal the controller 135 to change the threshold that causes the parking of the heads of the hard drive 2035. For example if the portable computing device is operating on portable battery power rather than operating on Alternating Current from an external power supply, the portable computing device is more likely mobile and therefore more likely to be dropped, therefore changing the threshold that causes the controller to park the heads of the hard drive 2203.

Figure 3:
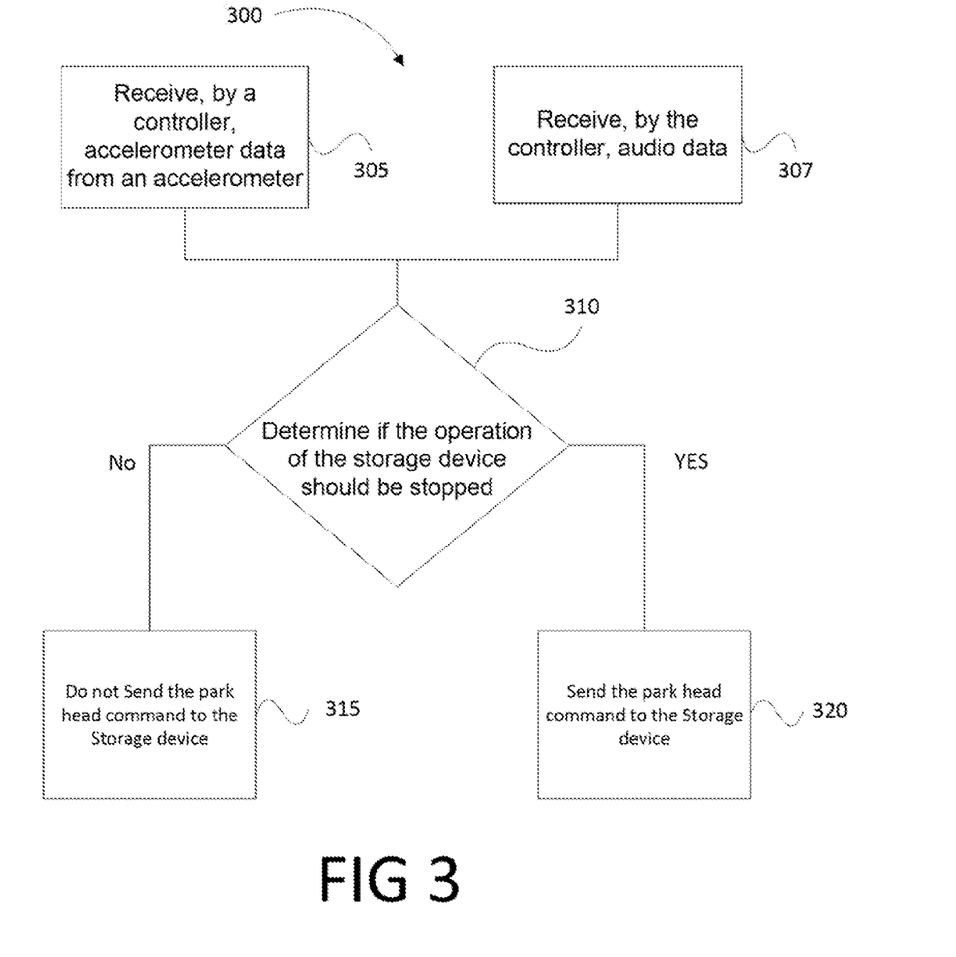
FIG. 3 is a flow diagram of a method of controlling the operation of a storage device according to an example implementation.

FIG. 3 is a flow diagram of a method 300 of controlling the stoppage of a storage device according to an example implementation. The method includes receiving, by a controller such as controller 135, accelerometer data from an accelerometer at 305. Audio data can be received by the controller at 307. It is determined if the operation of the storage device should be stopped at 310 based on whether the audio is playing and whether the data from the accelerometer is above an accelerometer threshold, if the storage device should be stopped the method proceeds to 320 and the park head command is sent to the storage device. If the storage device should not be stopped the method proceeds to 315 and the park head command is not sent to the storage device.

Figure 4:
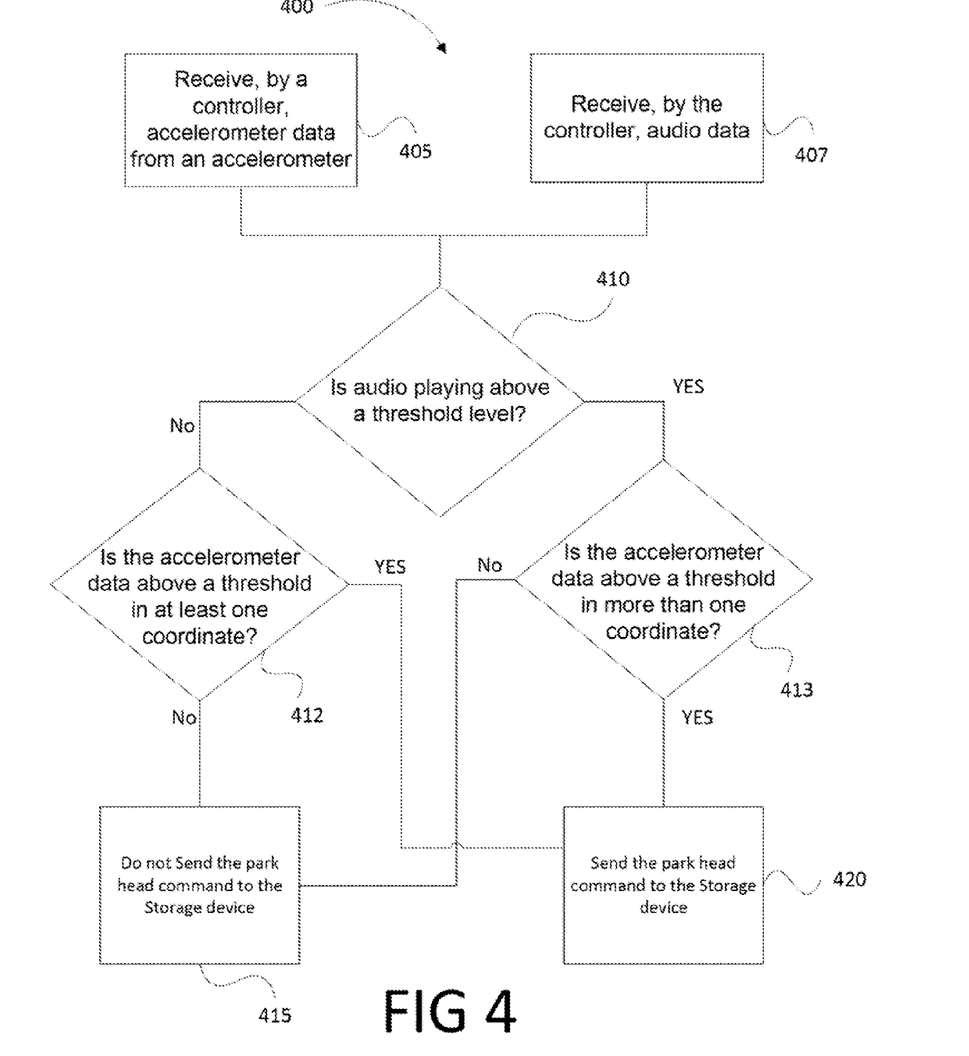
FIG. 4 is a flow diagram of a method of controlling the operation of a storage device according to an example implementation.

FIG. 4 is a flow diagram of a method 400 of controlling the stoppage of a storage device according to an example implementation. The method includes receiving, by a controller such as controller 135, accelerometer data from an accelerometer at 405. Audio data can be received by the controller at 407. It is determined if audio is playing at 410, if audio is playing at 410 then at 413 it is determined if the accelerometer is above the threshold along more than one axis 413 and if it is then the park head command is sent at 420 but if it is not then the park head command is not sent at 415. If the audio is not above a threshold level at 410 then at 412 it is determined if the accelerometer is above a threshold along at least one axis and if it is at 420 the park command is sent and if it is not then at 415 the park command is not sent.

The accelerometer data can include data representing movement in each of a set of axis for example x, y and z. The threshold can be different for each axis of the set of axis.

Figure 5:
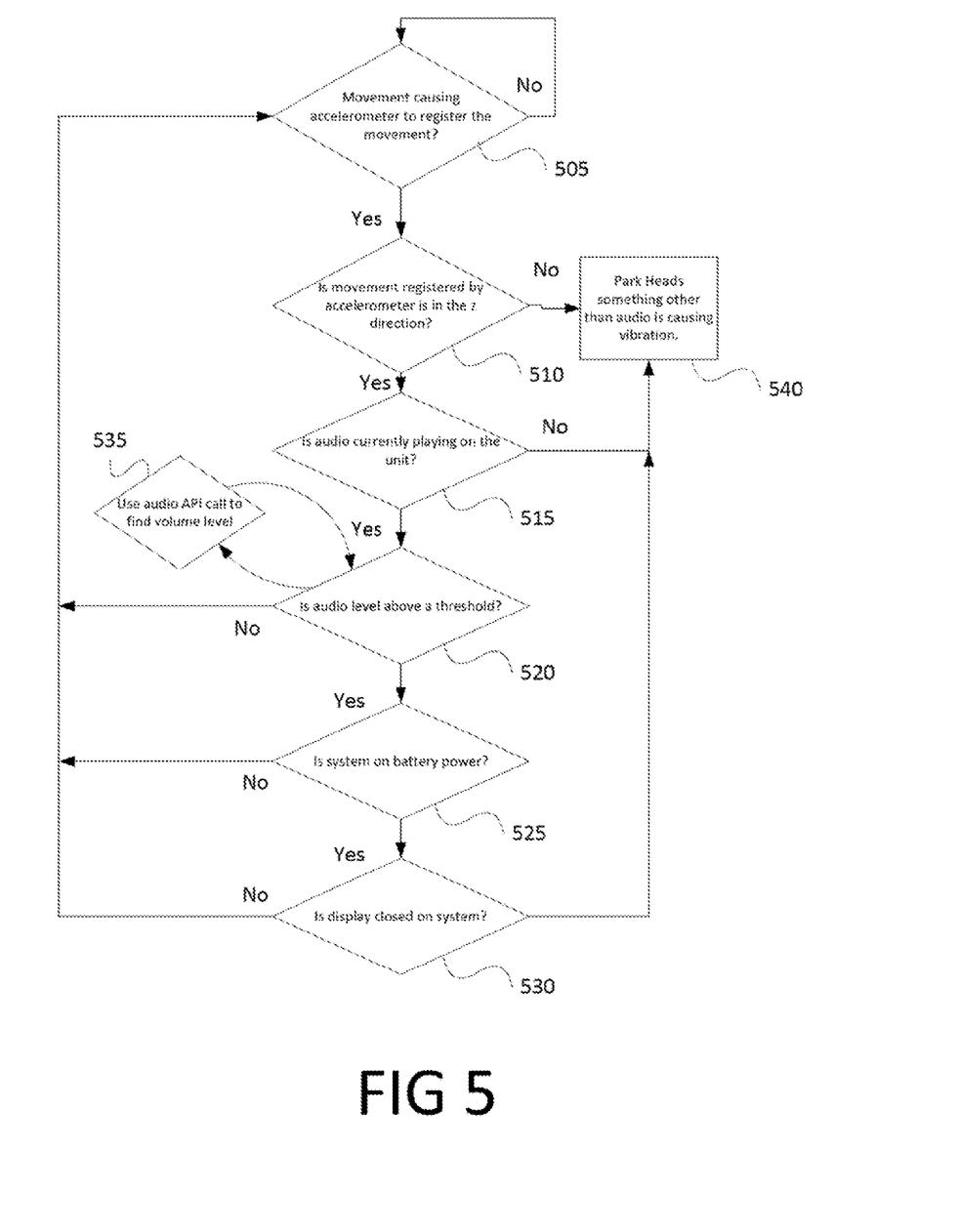
FIG. 5 is a flow diagram of a method of controlling the operation of a storage device according to an example implementation.

FIG. 5 is a flow diagram of a method of controlling the stoppage of a storage device according to an example implementation. The method repeatedly checks to see if vibrations are causing the accelerometer to register movement at 505. It is determined if the movement registered by accelerometer is in the z direction at 510, if not then something other than audio is causing the movement and that the heads of the hard drive are parked at 540. If at 510 the answer is yes, then it is determined if audio is playing at 515, if not then something other than audio is causing the movement and that the heads of the hard drive are parked at 540. If audio is playing at 515, then it is determined at 520 if the audio level is above a threshold. The determination can be from an API call at 535. If the audio level as not above the threshold level the method returns to 505. If the audio level is above the threshold level, at 525 it is determined if the system is operating on battery power, if not the method returns to 505. If the system is operating on battery power next it can be determined if the display is closed at 530. If the display is not closed the method returns to 505, if the display is closed the method parks the heads at 540.

Figure 6:
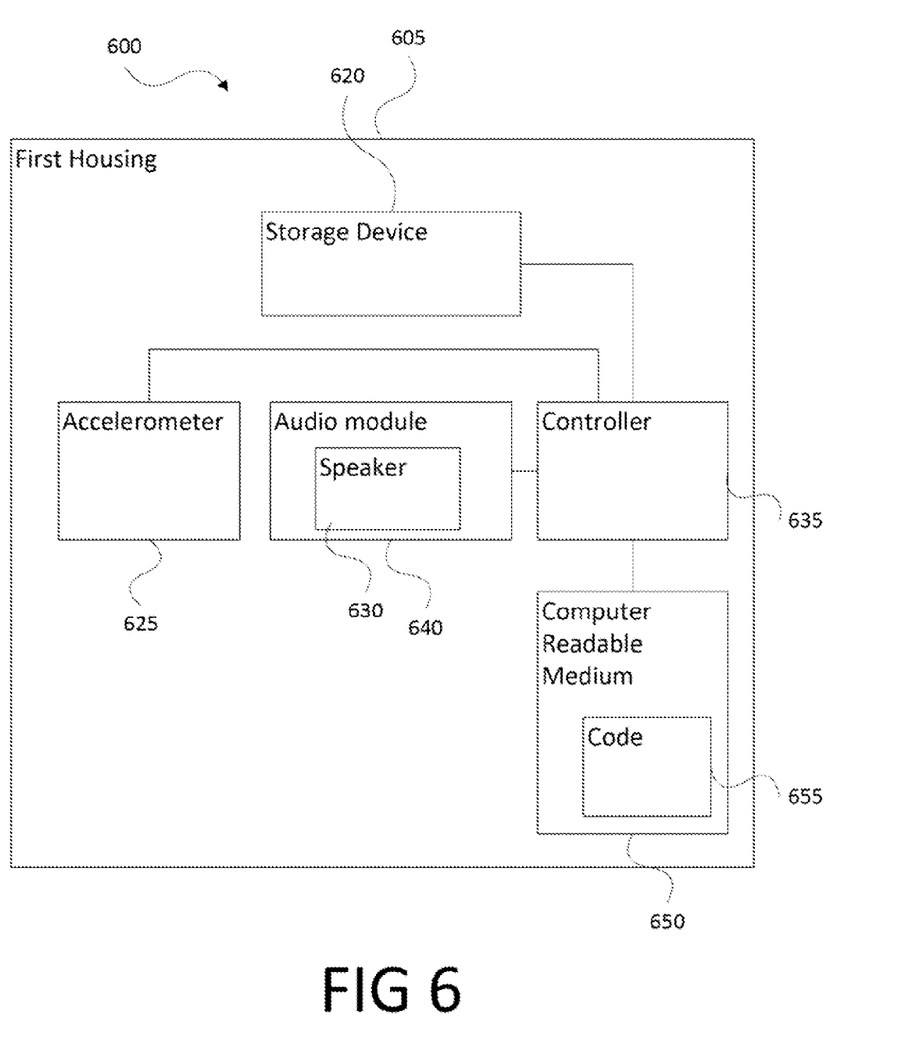
FIG. 6 is a computing system including a computer readable medium according to an example implementation.

FIG. 6 is a portable computing device 600 including a first housing 605 and a computer readable medium 650 according to an example implementation.

A computer readable medium 650 includes code 655 that if executed by a controller 635, in a computing device causes the controller 635 to receive accelerometer data from an accelerometer 625. The code can also cause the controller to receive audio data and determine if the operation of the storage device 620 should be stopped based on whether the audio is playing and whether the data from the accelerometer is above an accelerometer threshold. Audio data may be provided by an audio module 640 about the output of a speaker 630.

The code if executed may stop the storage device if the accelerometer data is above the accelerometer threshold along less than two axis and the audio is playing above the audio threshold.

The techniques described above may be embodied in a computer-readable medium for configuring a computing system to execute the method. The computer readable media may include, for example and without limitation, any number of the following non-transitive mediums magnetic storage media including disk and tape storage media; optical storage media such as compact disk media (e.g., CD-ROM, CD-R, etc.) and digital video disk storage medial holographic memory, nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and various types of computer-readable media may be used to store the software modules discussed herein. Computing systems may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A portable computing device comprising:
   a sensor capable of determining movement along a first axis and a second axis and generating sensor data of the movement;
   a speaker to output audio;
   a storage device; and
   a controller to suspend operation of the storage device when the sensor data is above a first threshold level, wherein the controller adjusts the first threshold level based on a level of audio output being generated by the portable computing device.

2. The system of claim 1, wherein the threshold is adjusted higher or lower based on whether a display of the portable computing device is in an open or closed position.

3. The system of claim 1, wherein the threshold is adjusted higher or lower based on whether the portable computing system is on battery power.

4. The system of claim 1, wherein, to suspend operation of the storage device, the controller parks a read/write head of the storage device.

5. The system of claim 4, further comprising a parked position for the read/write head of the storage device that is spaced further away from a data storage surface of the storage device than when in an operative position.

6. The system of claim 1, further comprising an application programming interface (API) to provide the audio level to the controller.

7. The system of claim 1, further comprising a basic input/output system (BIOS) to modify registers of the sensor to adjust the first threshold level.

8. The system of claim 1, further comprising an advanced configuration and power interface (ACPI) to cause changes to the threshold level.

9. The portable computing device of claim 1, further comprising a microphone to determine the level of audio output being generated by the portable computing device.

10. A method of controlling the stoppage of a storage device comprising:
    receiving, by a controller, accelerometer data from an accelerometer;
    receiving, by the controller, audio data;
    determining if the operation of the storage device should be stopped based on whether the audio is playing and whether the data from the accelerometer is above an accelerometer threshold.

11. The method of claim 10, wherein the accelerometer data includes data representing movement along an axis.

12. The method of claim 11, wherein the storage device is not stopped if the data is above the accelerometer threshold along less than two axis and the audio is playing above the audio threshold.

13. The method of claim 12, wherein the storage device is stopped if the data from the accelerometer is above the threshold along two or more axis.

14. The method of claim 12, wherein the storage device is stopped if the data from the accelerometer is above the accelerometer threshold along less than two axis and the audio is not playing.

15. The method of claim 10, wherein the accelerometer threshold is different for each axis of the set.

16. The computer readable medium of claim 15 further comprising code that if executed causes a computing device to:
    not stop the storage device if the accelerometer data is above the accelerometer threshold along less than two axes.

17. The computer readable medium of claim 15, further comprising an application programming interface (API) to provide the audio level to the controller.

18. The computer readable medium of claim 15, further comprising code to use a basic input/output system (BIOS) to modify registers of the accelerometer to adjust the accelerometer threshold level.

19. The computer readable medium of claim 15, further comprising an advanced configuration and power interface (ACPI) to cause changes to the accelerometer threshold level.

20. A computer readable medium comprising code that if executed by a controller in a computing device causes the controller to:
    receive accelerometer data from an accelerometer;
    receive audio data;
    determine if the operation of the storage device should be stopped based on all of: whether the audio is playing, whether the audio level is above an audio threshold, whether the data from the accelerometer is above an accelerometer threshold, whether motion detected by the accelerometer is on only one axis, whether the computing device is operating on battery power and whether a display of the computing device is in a closed or open position;

wherein stopping operation of the storage device comprises moving a read/write head of the storage device to a parked position spaced further away from a data storage surface of the storage device than when in an operative position.

* * * * *